(12) United States Patent
Ogawara et al.

(10) Patent No.: US 7,386,230 B2
(45) Date of Patent: Jun. 10, 2008

(54) WIDE-ANGLE SHOOTING APPARATUS AND OPTICAL DEVICE

(75) Inventors: Yoshiaki Ogawara, Tokyo (JP); Hidemi Takakuwa, Kanagawa (JP); Hiroaki Seki, Kanagawa (JP)

(73) Assignee: Sony Corporation, Tokyo (JP)

( * ) Notice: Subject to any disclaimer, the term of this patent is extended or adjusted under 35 U.S.C. 154(b) by 533 days.

(21) Appl. No.: 11/183,415

(22) Filed: Jul. 18, 2005

(65) Prior Publication Data
US 2006/0029386 A1    Feb. 9, 2006

(30) Foreign Application Priority Data
Aug. 5, 2004    (JP)    ............................ P2004-229669

(51) Int. Cl.
*G03B 11/00*    (2006.01)
*G02B 17/00*    (2006.01)
(52) U.S. Cl. ...................................... 396/544; 359/727
(58) Field of Classification Search ................. 396/351, 396/544; 359/483, 503, 504, 725, 726, 727, 359/729, 730, 731, 850, 866; 348/335
See application file for complete search history.

(56) References Cited

U.S. PATENT DOCUMENTS

| | | | | |
|---|---|---|---|---|
| 5,854,713 A | * | 12/1998 | Kuroda et al. | 359/850 |
| 6,222,683 B1 | * | 4/2001 | Hoogland et al. | 359/725 |
| 6,424,377 B1 | * | 7/2002 | Driscoll et al. | 348/3 |
| 6,597,520 B2 | * | 7/2003 | Wallerstein et al. | 359/725 |

* cited by examiner

*Primary Examiner*—Rodney E Fuller
(74) *Attorney, Agent, or Firm*—Sonnenschein Nath & Rosenthal LLP

(57) ABSTRACT

A wide-angle shooting apparatus includes a convex surface structure which reflects light from outside, a concave surface structure having a first polarizing device which permits the light from outside to be transmitted and reflects the light reflected by the convex surface structure. The concave surface structure is positioned before the convex surface structure. The apparatus also includes a second polarizing device which permits the light reflected by the concave surface structure to be transmitted and shielding direct light beam transmitted through the concave surface structure. The second polarizing device is positioned at a part to which the light reflected by the concave surface structure is concentrated. The apparatus further includes image-shooting device which receives the light transmitted through the second polarizing device and shoots an image.

9 Claims, 13 Drawing Sheets

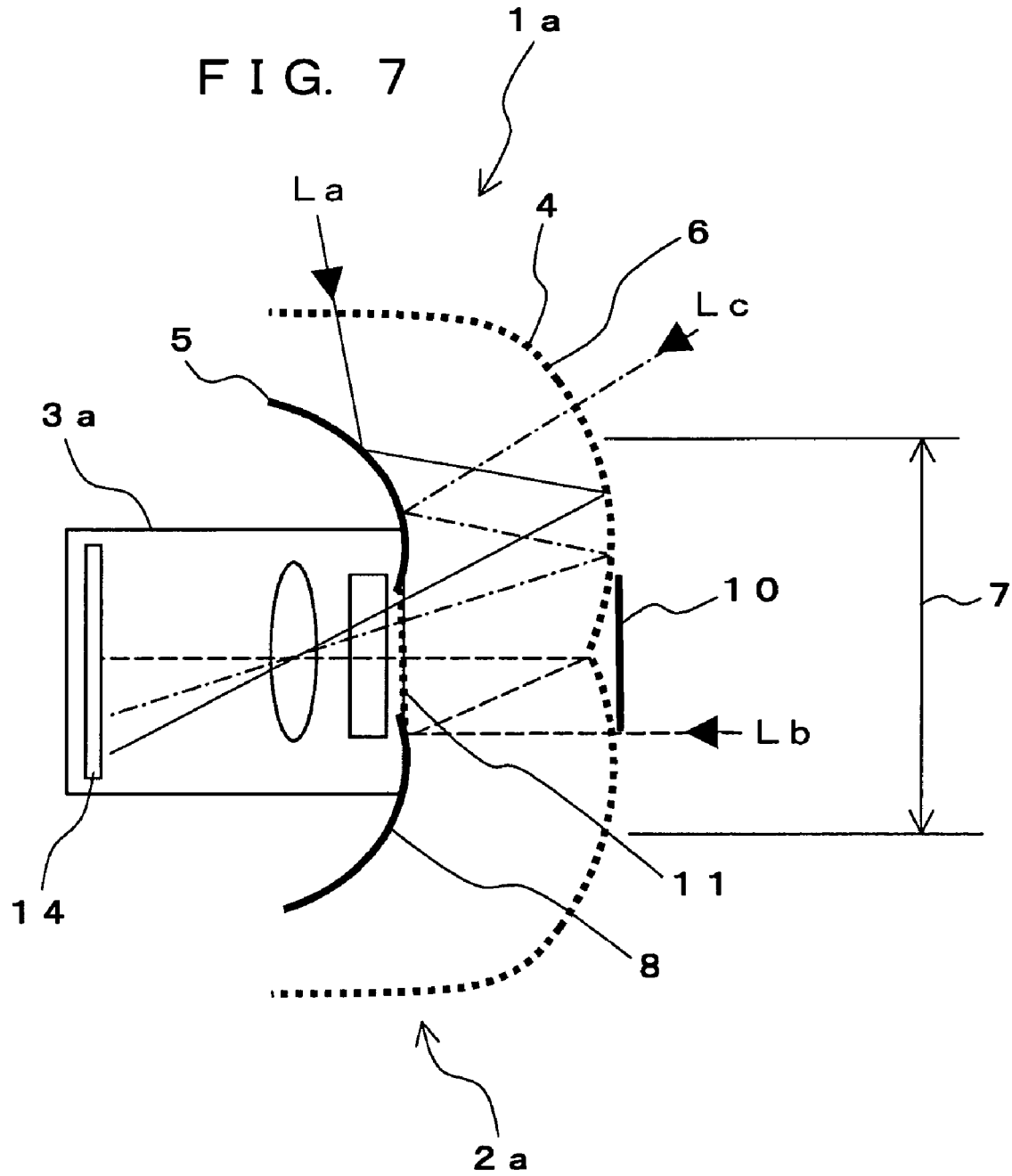

WIDE-ANGLE SHOOTING APPARATUS AND OPTICAL DEVICE

CROSSREFERENCE TO RELATED APPLICATION

The present invention contains subject matter related to Japanese Patent Application No. JP 2004-229669 filed in the Japanese Patent Office on Aug. 5, 2004, the entire contents of which being incorporated herein by reference.

BACKGROUND OF THE INVENTION

1. Field of the Invention

The present invention relates to a wide-angle shooting apparatus for shooting a wide-angle image and an optical device constituting the shooting apparatus. More particularly, it relates to a wide-angle shooting apparatus and the like that are used for a camera built in a vehicle, a door phone or the like for checking a safe condition.

2. Description of Related Art

FIG. 1 is a diagram for illustrating a past wide-angle shooting apparatus. The past wide-angle shooting apparatus 51 has a reflecting conical mirror 52 and a camera unit 53. The camera unit 53 has a pinhole for focusing light to a focal point and a two-dimensional image sensor 55.

The apparatus 51 also has a camera-processing unit 56 and a conversion-processing unit 57, which are used for processing image data shot in the image sensor 55.

In the past wide-angle shooting apparatus 51, the image sensor 55 of the camera unit 53 receives light L reflected by the reflecting conical mirror 52 to shoot an image. Thus, the image sensor 55 shoots a semicircular image 58.

The camera-processing unit 56 receives and processes the image data from the image sensor 55 to transmit data of the semicircular image 58. The conversion-processing unit 57 performs coordinate conversion on the data of the semicircular image 58 on the basis of a center of circle for the semicircular image into data of rectangular image 59 such that its angle measure and a distance from the center of circle can be conformed to the rectangular image. This allows the rectangular image to be converted from the semicircular image.

Alternatively, it has been proposed in Japanese Patent Application Publication No. 2003-163819 that a wide-angle shooting apparatus is capable of shooting a wide-angle image by combining plural reflecting mirrors.

SUMMARY OF THE INVENTION

Generally, a two-dimensional image sensor has a rectangular shooting range of image. The above two-dimensional image sensor using the conical mirror, however, shoots a semicircular image. This causes any light-sensitive elements to be unutilized, thereby reducing efficiency in use to decrease in its sensitivity.

In performing the coordinate conversion on the data of the semicircular image into the rectangular image, a part near the center of circle for the semicircular image is converted into a smaller image so that coarse image can be seen. Thus, the converted rectangular image has been totally balanced by degrading in fineness thereof at a part apart from the center of circle so as to make coarseness of the part apart from the center of circle consonant with that of the part near the center of circle.

Thus, in such the past wide-angle shooting apparatus using the conical mirror, it is desirable to upgrade fineness in an image. The past wide-angle shooting apparatus includes a conversion-processing unit, thereby causing the cost thereof to be increased.

The past wide-angle shooting apparatus capable of shooting a wide-angle image by combining plural reflecting mirrors has less visibility in a shot image if direct light beam is made incident upon a two-dimensional image sensor. Thus, it also has a shielding plate, thereby causing many blind spots.

There can be a need for providing a wide-angle shooting apparatus having a simple configuration for shooting a wide-angle image and lacking conversion processing for the shot image and optical device constituting the shooting apparatus.

According to an embodiment of the present invention, there is provided a wide-angle shooting apparatus. The apparatus has a convex surface structure, which reflects light from outside. The apparatus also has a concave surface structure having a first polarizing device, which permits the light from outside to be transmitted and reflects the light that has been reflected by the convex surface structure. The concave surface structure is positioned before the convex surface structure. The apparatus further has a second polarizing device, which permits the light reflected by the concave surface structure to be transmitted and shields direct light beam transmitted through the concave surface structure. The second polarizing device is positioned at a light incident portion to which the light reflected by the concave surface structure is concentrated. The apparatus additionally has image-shooting device, which receives the light transmitted through the second polarizing device, and shoots an image.

According to another embodiment of the present invention, there is provided optical device. The optical device has a convex surface structure, which reflects light from outside. The optical device also has a concave surface structure having a first polarizing device, which permits the light from outside to be transmitted and reflects the light reflected by the convex surface structure. The concave surface structure is positioned before the convex surface structure.

The optical device further has a second polarizing device, which permits the light reflected by the concave surface structure to be transmitted and shields direct light beam transmitted through the concave surface structure. The second polarizing device is positioned at a part to which the light reflected by the concave surface structure is concentrated.

On the embodiments of the present invention, in the wide-angle shooting apparatus and the optical device constituting the shooting apparatus, the light from the outside is transmitted through the concave surface structure and made incident onto the convex surface structure. The light incident on the convex surface structure is reflected toward the concave surface structure. The concave surface structure then reflects the light incident from the convex surface structure toward the second polarizing device.

The second polarizing device transmits light reflected by the convex surface structure and the concave surface structure to make the light incident to the image-shooting device. The second polarizing device also shields the direct light beam transmitted through the concave surface structure.

Thus, according to the embodiments of the wide-angle shooting apparatus of the invention, the apparatus receives light widely on its convex and concave surface structures so that the image-shooting device can shoot a rectangular image, thereby omitting a distortion-correction function therefor. This allows to be removed the conversion-processing unit having any distortion-correction function, thereby lowering in its product cost.

Further, according to the embodiments of the wide-angle shooting apparatus of the invention, any light-sensitive elements can be utilized so that efficiency in use of the pixels in the image-shooting device is made larger to allow an image having a high resolution to be obtained. Further, the concave surface structure transmits the light from outside, thereby causing no blind spot.

According to the embodiments of the optical device of the present invention, by utilizing a reflection and a polarization of the convex and concave surface structures to receive incident light widely, the optical device can be constituted of mirrors and polarizing films. This allows the optical device having a simple configuration to be realized, thereby downsizing it and lowering in its product cost.

The concluding portion of this specification particularly points out and directly claims the subject matter of the present invention. However those skill in the art will best understand both the organization and method of operation of the invention, together with further advantages and objects thereof, by reading the remaining portions of the specification in view of the accompanying drawing(s) wherein like reference characters refer to like elements.

BRIEF DESCRIPTION OF THE DRAWINGS

FIG. 7 is a diagram for illustrating a relationship between an incidence angle and an optical path;

DESCRIPTION OF THE PREFERRED EMBODIMENTS

The following will describe preferred embodiments of a wide-angle shooting apparatus and an optical device of this invention in accordance with accompanying drawings.

[Configuration of Embodiment of Wide-angle Shooting Apparatus]

Figure 1:
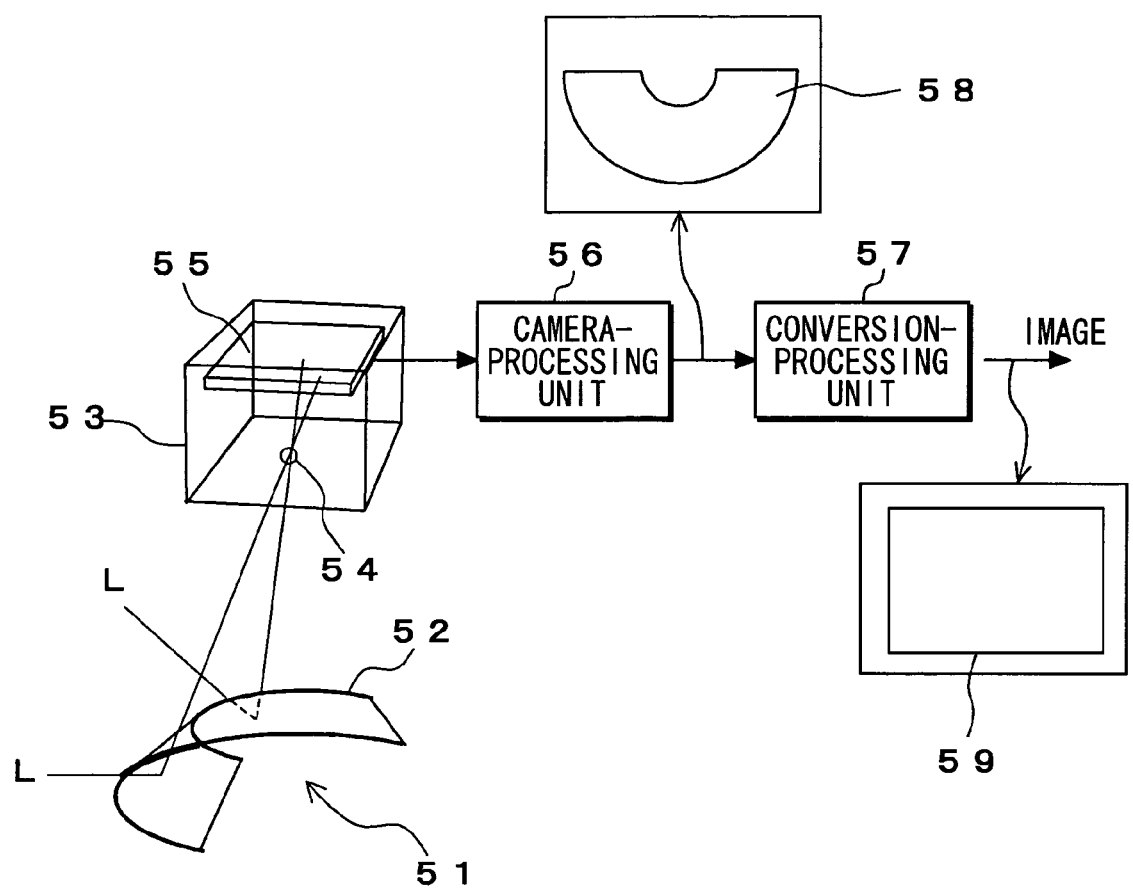
FIG. 1 is a diagram for illustrating a configuration of a wide-angle shooting apparatus of related art.
Figure 2A:
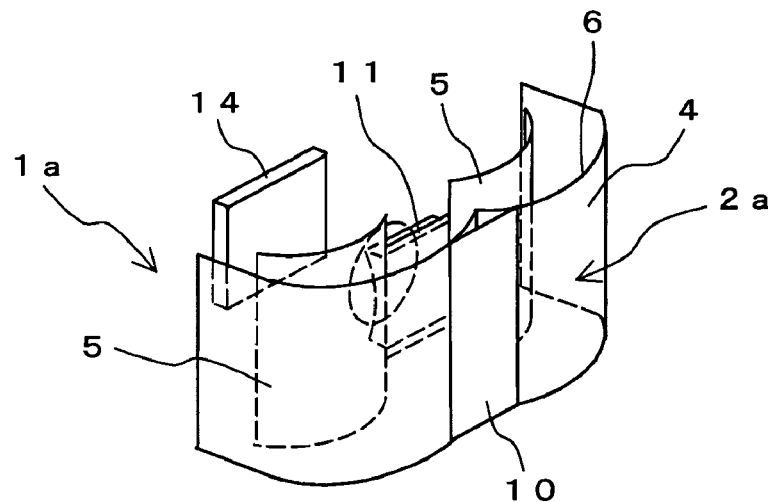
FIG. 2A is a perspective view of a first embodiment of a wide-angle shooting apparatus according to the invention for showing a configuration thereof.
Figure 2B:
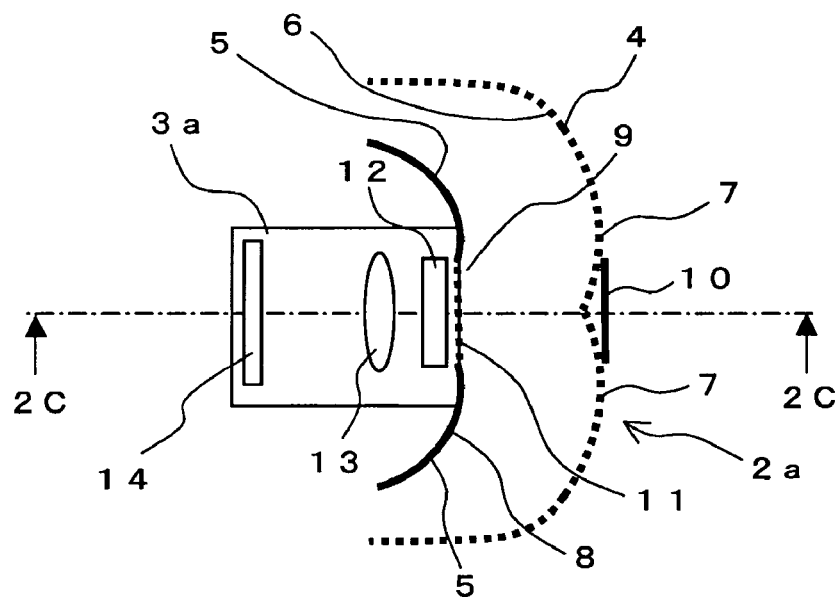
FIG. 2B is a plan view thereof.
Figure 2C:
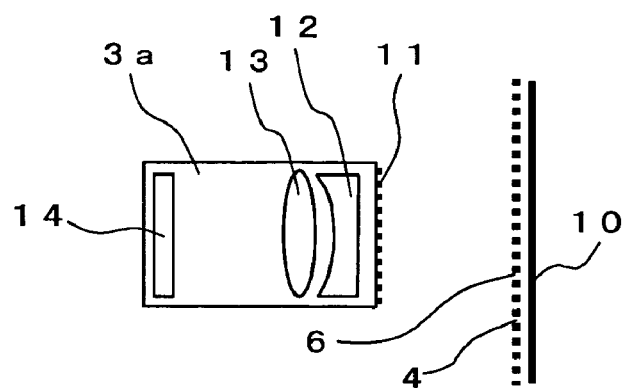
FIG. 2C is a sectional view thereof taken along the line 2C-2C shown in FIG. 2B.

FIGS. 2A through 2C show a configuration of the wide-angle shooting apparatus 1a as a first embodiment according to the invention. FIG. 2A is a perspective view of the wide-angle shooting apparatus 1a. FIG. 2B is a plan view thereof. FIG. 2C is a sectional view thereof taken along the line 2C-2C shown in FIG. 2B. Note that optics of the wide-angle shooting apparatus 1a are illustrated as their patterns in FIGS. 2A through 2C.

The wide-angle shooting apparatus 1a has an optical device 2a and a camera unit 3a. First, the following will describe a configuration of the optical device 2a.

The optical device 2a has a hollow structure, for example, in which a wall-like reflecting convex surface structure 5 as a convex surface structure is provided inside thereof, namely in a side of the camera unit 3a while a wall-like transmitting and reflecting concave surface structure 4 as a concave surface structure is provided outside thereof. These wall-like reflecting convex surface structure 5 and wall-like transmitting and reflecting concave surface structure 4 have horizontal curvatures, respectively, but no vertical curvature so that they stand upright. Hereinafter, such the structure will be referred to as "wall-like" member.

A front inner surface of the surface structure 4 is formed as concave. Inner surfaces of the right and left ends thereof that follow the concave front inner surface are respectively formed as plane. A first polarizing film 6, which will be described later, composed of a linearly polarizing film of reflection type and a λ/4 delay film as a first polarizing means is placed on the whole inner surface of the surface structure 4 so that the front inner surface of the surface structure 4 can be formed as a reflecting concave surface 7.

The wall-like reflecting convex surface structure 5 is opposed to the inner surface of the surface 4. An outer surface of the surface structure 5 is formed as a reflecting convex surface 8. The reflecting convex surface 8 constitutes a reflecting mirror, for example. The reflecting convex surface 8 has a curved form of convex shape and such a structure that right and left ends thereof are respectively spread outwardly in side ends of the optical device 2a and faced laterally, and a part around a center thereof is faced front. The reflecting convex surface 8 reflects light transmitted through the surface structure 4 toward the reflecting concave surface 7 of the surface structure 4.

In the optical device 2a, a light incident portion 9 is provided at a middle of the surface structure 5. A light-shielding plate 10 is also provided at a front outer surface of a middle of the surface structure 4. The light-shielding plate 10 as light-shielding means is disposed in front of the light incident portion 9 so that light incident from the front of the optical device 2a is shielded thereby to prevent the light from being made directly incident to the light incident portion 9.

Next, the camera unit 3a as image-shooting means has a second polarizing film 11, a wall-like concave lens 12 for aberration correction, a convex lens 13, and a two-dimensional image sensor 14. The camera unit 3a is attached to the optical device 2a with the second polarizing film 11 being positioned at the light incident portion 9.

The second polarizing film 11 as second polarizing means includes a linearly polarizing film and a λ/4 delay film, which will be described later, to select light to be transmitted. The wall-like concave lens 12 performs aberration correction on the light transmitted through the second polarizing film 11. The convex lens 13 then focuses the light on the two-dimensional image sensor 14.

Figure 3:
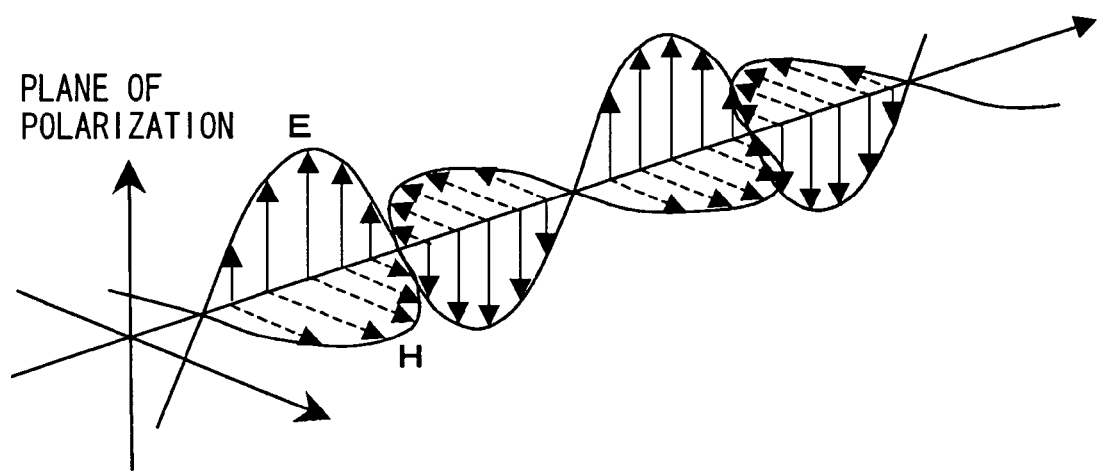
FIG. 3 is a diagram for illustrating a situation relative to a propagation of an electric field and a magnetic field of light.

The following will describe configurations of the polarizing films used in the optical device 2a and the camera unit 3a. FIG. 3 is a diagram for illustrating a situation relative to a propagation of an electric field and a magnetic field of light. Light is defined as being composed of a pulsating electric field E and a magnetic field H that is pulsating in a direction perpendicular to the electric field E, as well known, and traverse wave such that its pulsating direction is perpendicular to its propagation direction.

An electric field can be generally resolved into Ex and Ey components. If they have the same phase, the linearly polarized light occurs. If they have a difference in phase, elliptically polarized light occurs. Note that the elliptically polarized light will be described as circularly polarized light in the following description.

Figure 4A:
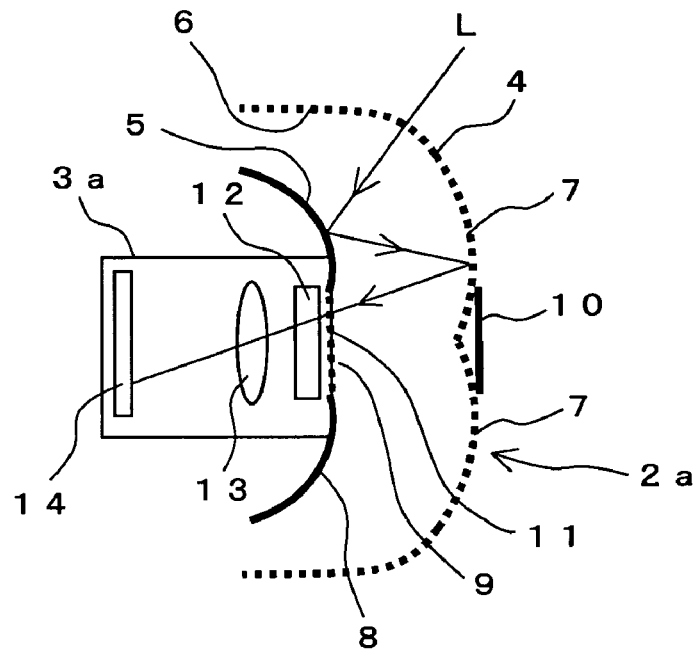
FIG. 4A is a plane view of the first embodiment of the wide-angle shooting apparatus according to the invention for illustrating a configuration of important portions and operation thereof.
Figure 4B:
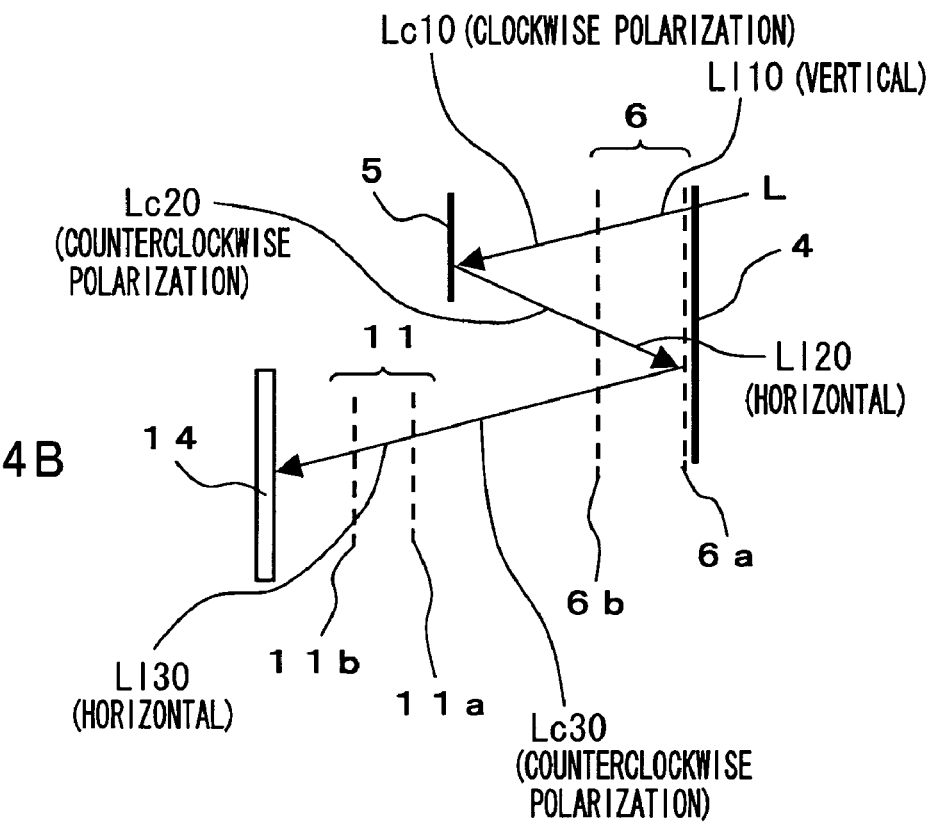
FIG. 4B is a diagram for illustrating conversion processing in polarization states.

FIGS. 4A and 4B show a configuration of important portions and operations of the first embodiment of the wide-angle shooting apparatus 1a according to the invention. FIG. 4A is a perspective view thereof and FIG. 4B illustrates conversion processing in polarization states.

The first polarizing film 6 provided on the surface structure 4 shown in FIG. 4A has the linearly polarizing film 6a of reflection type and the λ/4 delay film 6b. The second polarizing film 11 provided on the light incident portion 9 has the λ/4 delay film 11a and the linearly polarizing film 11b.

The λ/4 delay film 6b of the first polarizing film 6 and the λ/4 delay film 11a of the second polarizing film 11 are referred to as a quarter wavelength retardation plate. The quarter wavelength retardation plate delays or advances a phase of Ex or Ey component in a electric field of transmitted light by a quarter of the wavelength thereof (π/2), thereby allowing state in polarization of the transmitted light to be converted.

Figure 5A:
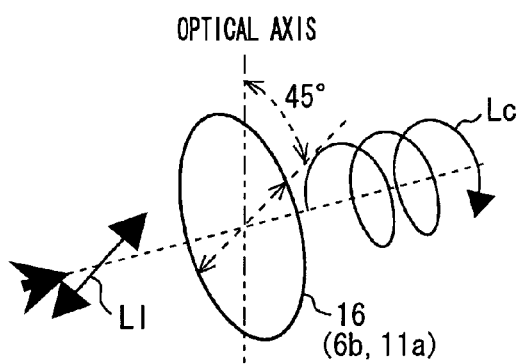
FIGS. 5A through 5F are diagrams each for illustrating an operation principle of a quarter wavelength retardation plate.

FIGS. 5A through 5F are diagrams each for illustrating an operation principle of the quarter wavelength retardation plate. If linearly polarized light L1, a polarization direction of which is not matched with X or Y axis is made incident to the quarter wavelength retardation plate 16, the plate 16 converts the linearly polarized light L1 into circularly polarized light Lc, for example, clockwise one and outputs it, as shown in FIG. 5A.

Figure 5D:
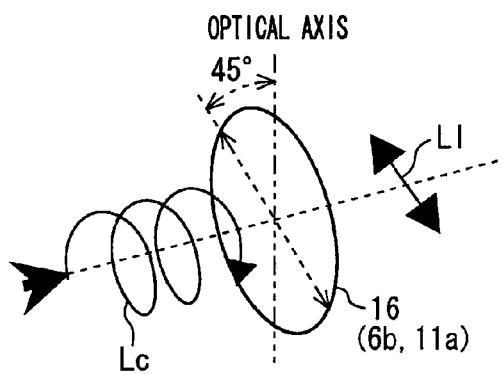
Figure 5B:
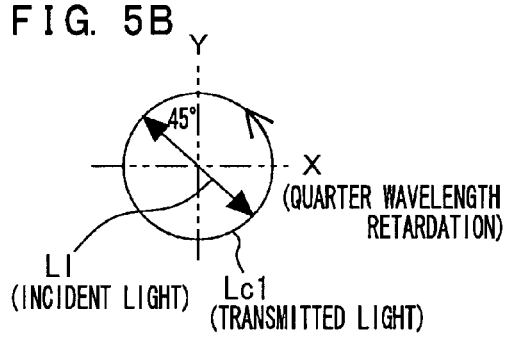

For example, as shown in FIG. 5B, if linearly polarized light L1, a polarization direction of which is inclined at about −45 degrees from Y axis is made incident to the quarter wavelength retardation plate 16, the plate 16 converts such the linear polarized light L1 into circularly polarized light Lc1 that rotates counterclockwise with an elapsed period of time.

Figure 5E:
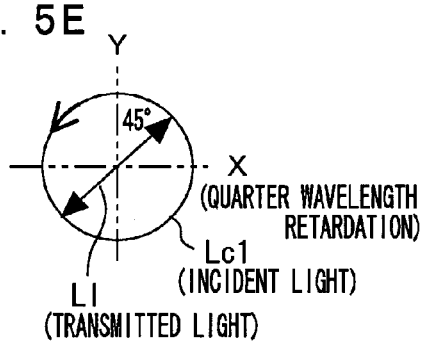
Figure 5C:
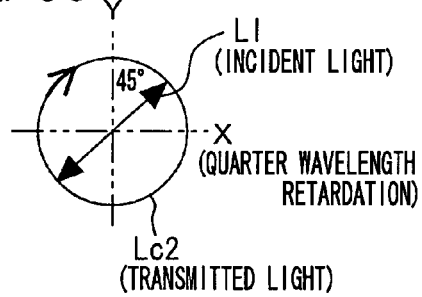

Alternatively, if linearly polarized light L1, a polarization direction of which is inclined at about 45 degrees from Y axis is made incident to the quarter wavelength retardation plate 16, the plate 16 converts such the linearly polarized light L1 into circularly polarized light Lc2, as shown in FIG. 5C, that rotates clockwise.

If circularly polarized light Lc is made incident to the quarter wavelength retardation plate 16, the plate 16 converts the circularly polarized light Lc into linearly polarized light L1 and outputs it, as shown in FIG. 5D.

For example, as shown in FIG. 5E, if circularly polarized light Lc1 that rotates counterclockwise is made incident to the quarter wavelength retardation plate 16, the plate 16 converts such the circularly polarized light Lc1 into linearly polarized light L1, a polarization direction of which is inclined at about 45 degrees from Y axis.

Figure 5F:
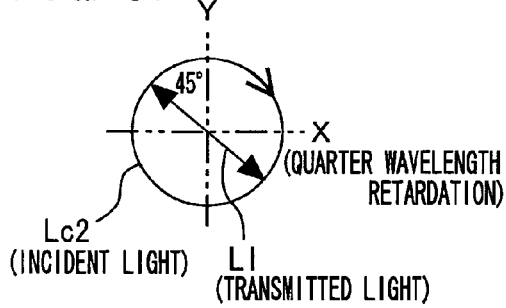

Alternatively, if circularly polarized light Lc2 that rotates clockwise is made incident to the quarter wavelength retardation plate 16, the plate 16 converts such the circularly polarized light Lc2 into linearly polarized light L1, a polarization direction of which is inclined at about −45 degrees from Y axis, as shown in FIG. 5F.

The linearly polarizing film 6a of reflection type of the first polarizing film 6 and the linearly polarizing film 11b of the second polarizing film 11, which have been shown in FIG. 4B, are referred to as a polarizer. The polarizer can transmit only one directional component of electric field in the incident light. Note that a plane of polarization of the linearly polarizing film 6a of reflection type is perpendicular to that of the linearly polarizing film 11b.

In the first polarizing film 6, the linearly polarizing film 6a is positioned at a side of the wall-like transmitting and reflecting concave surface structure 4 and the λ/4 delay film 6b faces the wall-like reflecting convex surface structure 5. As shown in FIG. 4B, if light L is made incident to the surface structure 4 from outside, the linearly polarizing film 6a transmits only linearly polarized light L110 having one polarization direction, for example, vertical one. The λ/4 delay film 6b then converts such the linearly polarized light L110 into circularly polarized light Lc10, for example, clockwise one, according to the polarization direction thereof.

The wall-like reflecting convex surface structure 5 then reflects the circularly polarized light Lc10, so that circularly polarized light Lc20 thus reflected that rotates counterclockwise can be formed. When the reflected light Lc20 is made incident to the first polarizing film 6, the λ/4 delay film 6b then converts the circularly polarized light Lc20 into linearly polarized light L120 according to a polarization direction, i.e., horizontal one, that is perpendicular to the above polarization direction, vertical one of the linearly polarized light L110. The linearly polarized light L120 is then reflected by the linearly polarizing film 6a of reflection type. The λ/4 delay film 6b further converts the linearly polarized light L120 thus reflected into circularly polarized light Lc30 that rotates counterclockwise, for example. The circularly polarized light Lc30 is made incident to the second polarizing film 11.

In the second polarizing film 11, the λ/4 delay film 11a faces the wall-like transmitting and reflecting concave surface structure 4. When the circularly polarized light Lc30 derived from the first polarizing film 6 is made incident into the second polarizing film 11, the λ/4 delay film 11a converts the circularly polarized light Lc30 into linearly polarized light L130 according to a polarization direction, i.e., horizontal one.

Thus, the circularly polarized light such as the polarized light Lc10 rotating clockwise, which has been transmitted through the wall-like transmitting and reflecting concave surface structure 4 and the first polarizing film 6, is also made incident to the second polarizing film 11. Such the polarized light will be referred to as "direct light beam". This circularly polarized light has a rotational direction opposite to that, counterclockwise, of the circular polarized light Lc30 (referred to as "reflected light beam"), which has been reflected by the surface structures 4 and 5, and is made incident to the second polarizing film 11.

Therefore, when the λ/4 delay film 11a converts the direct light beam and the reflected light beam to their linearly polarized light, so that polarization directions of their linearly polarized light are perpendicular to each other. This allows the linearly polarizing film 11b to transmit only the reflected light beam and shield the direct light beam.

Figure 6:
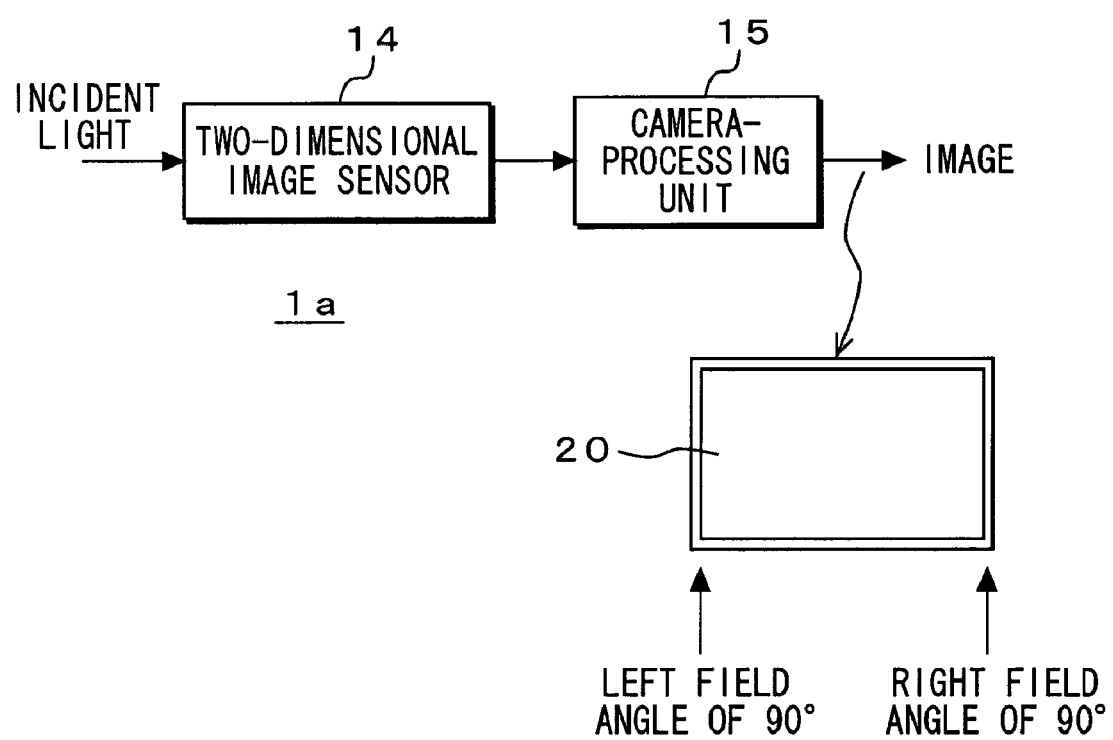
FIG. 6 is a block diagram for illustrating an example of a control system used in the embodiments of wide-angle shooting apparatus.

FIG. 6 is a block diagram for illustrating an example of a control system used in the embodiments of wide-angle shooting apparatus according to the invention. In the wide-angle shooting apparatus 1a, a two-dimensional image sensor 14 is connected to a camera-processing unit 15. The apparatus 1a obtains images from data shot by the image sensor 14.

Thus, the apparatus 1a obtains data of rectangular image 20 optically from the optical devices 2a, thereby omitting a distortion-correction function therefor. This allows to be removed the conversion-processing unit 57 having any distortion-correction function.

(Operation of Wide-angle Shooting Apparatus)

The following will describe operations of the first embodiment of wide-angle shooting apparatus 1a according to the invention in accordance with the attached drawings, particularly, FIGS. 4A and 4B. Note that in this case, the first polarizing film 6 converts light that is made incident to the surface structure 4 from outside into circularly polarized light that rotates clockwise, viewed from a front of the apparatus 1a.

An electric field component in a direction of the light L that is made incident to the surface structure 4 from outside, as shown in FIG. 4A, is transmitted through the linearly polarizing film 6a of reflection type in the first polarizing film 6, as shown in FIG. 4B. It is noted that in this operation example, linearly polarized light of the above direction is referred to as "vertical" and that of the other direction orthogonal to the above direction is referred to as "horizontal".

Linearly polarized light L110 (vertical) transmitted through the linearly polarizing film 6a is converted by the λ/4 delay film 6b of the first polarizing film 6 into the circularly polarized light Lc10 that rotates clockwise. It is then derived from the surface structure 4.

The circularly polarized light Lc10 having the clockwise rotation direction that has been converted by the λ/4 delay film 6b of the first polarizing film 6 is reflected by the reflecting convex surface 8 of the surface structure 5, as shown in FIG. 4A, thereby causing its propagation direction to be reversed.

The circularly polarized light Lc20 thus reflected has a counterclockwise rotation direction. The circularly polarized light Lc20 is then made incident to the reflecting concave surface 7 of the surface structure 4. This circularly polarized light Lc20 is converted by the λ/4 delay film 6b of the first polarizing film 6 into the linearly polarized light L120 (horizontal).

The linearly polarized light L120 thus converted is then reflected by the linearly polarizing film 6a of reflection type because a plane of polarization of the linearly polarized light L120 is perpendicular to that of the linearly polarizing film 6a of reflection type in the surface structure 4. The linearly polarized light L120 (horizontal) thus reflected is converted by the λ/4 delay film 6b into circularly polarized light Lc30 that rotates counterclockwise. The circularly polarized light Lc30 thus converted is then derived from the surface structure 4.

The circularly polarized light Lc30 that has been reflected by the linearly polarizing film 6a is made incident into the light incident portion 9. Since the circularly polarized light Lc30 has a counterclockwise rotation direction and the second polarizing film 11 of the camera unit 3a is positioned at the light incident portion 9, the circularly polarized light Lc30 having counterclockwise rotation direction is made incident to the λ/4 delay film 11a.

The circularly polarized light Lc30 is converted by the λ/4 delay film 11a into the linearly polarized light L130 (horizontal), so that it is transmitted through the linearly polarizing film 11b. The linearly polarized light L130 transmitted trough the second polarizing film 11 is corrected in its aberration by the wall-like concave lens 12 to focus the image on the two-dimensional image sensor 14 through the convex lens 13.

Thus, the circularly polarized light Lc10, which has been received from outside and transmitted through the wall-like transmitting and reflecting concave surface structure 4 and the first polarizing film 6, has the clockwise rotation direction. If such the circular polarized light Lc10 is directly made incident to the light incident portion 9, it is converted by the λ/4 delay film 11a into the linearly polarized light (vertical).

As described above, a plane of polarization of the linearly polarizing film 6a of reflection type of the first polarizing film 6 is perpendicular to that of the linearly polarizing film 11b of the second polarizing film 11. This allows the direct light beam transmitted through the surface structure 4 to be shielded by the linearly polarizing film 11b of the second polarizing film 11.

Thus, the second polarizing film 11 enables the light reflected by the surface structure 5 to be made incident to the camera unit 3a, excluding the direct light beam transmitted through the surface structure 4.

FIG. 7 is a diagram for illustrating a relationship between an incidence angle and an optical path. The reflecting convex surface 8 of the wall-like reflecting convex surface structure 5 has a curved form of convex shape and such a structure that right and left ends thereof are respectively spread outwardly in side ends of the optical device 2a and faced laterally, and a part around a middle thereof is faced front. The reflecting convex surface 8 reflects the widely incident light toward the reflecting concave surface 7 of the surface structure 4.

The reflecting concave surface 7 has such a shape that light reflected by the reflecting convex surface 8 of the surface structure 5 could be made incident to the camera unit 3*a*.

In FIG. 7, incident light La, which is made incident widely, is illustrated by a solid line. The incident light La that is made incident from a side of the optical device 2*a*, for example, is transmitted through the surface structure 4 and reflected by a side portion of the reflecting convex surface 8 of the surface structure 5.

The light La reflected by the side portion of the reflecting convex surface 8 reaches the reflecting concave surface 7 of the surface structure 4. When reaching the reflecting concave surface 7, the light La is again reflected by the reflecting concave surface 7 toward the camera unit 3*a*. The light La is then made incident into the camera unit 3*a* and reaches a side end portion of the two-dimensional image sensor 14.

Since right and left side ends of the wall-like transmitting and reflecting concave surface structure 4 extends over the wall-like reflecting convex surface structure 5, such the light La could be made incident into the camera unit 3*a* through the conversion of polarization states that has been described in connection with FIGS. 4A and 4B.

Further, incident light Lb that is made incident from a front of the camera unit 3*a* is illustrated by a broken line. Regarding the incident light Lb that is made incident from a front of the camera unit 3*a*, the light-shielding plate 10 shields a part thereof and the other part thereof is transmitted through the surface structure 4 at outside of edge of the light-shielding plate 10 and reflected by a portion of the reflecting convex surface 8 of the surface structure 5, said portion being located around the light incident portion 9.

This portion of the reflecting convex surface 8 and the vicinity of a middle of the reflecting concave surface 7 of the surface structure 4 are formed so that the light Lb reflected by the portion of the reflecting convex surface 8 can be made incident toward the vicinity of the middle of the reflecting concave surface 7 of the surface structure 4 and the light Lb reaching the reflecting concave surface 7 can be again reflected by the reflecting concave surface 7 toward the camera unit 3*a*. The light Lb thus made incident into the camera unit 3*a* then reaches a vicinity of a middle of the two-dimensional image sensor 14.

Additionally, incident light Lc that is made incident from a midway between the front and the side of the camera unit 3*a* is illustrated by alternate long and short dashed lines. The incident light Lc is transmitted through the surface structure 4 and reflected by a front portion of the reflecting convex surface 8 of the surface structure 5. The light Lc reflected by the front portion of the reflecting convex surface 8 reaches the reflecting concave surface 7 of the surface structure 4. When reaching the reflecting concave surface 7, the light Lc is again reflected by the reflecting concave surface 7 toward the camera unit 3*a*. The light Lc that is made incident into the camera unit 3*a* then reaches the two-dimensional image sensor 14.

Thus, the light-shielding plate 10 causes the direct light beam to be prevented from being made incident into the camera unit 3*a* and the light that is made incident from sides of the light-shielding plate 10 can realize a horizontally continuous image. The mage can have the horizontal field angle of about 180 degrees, thereby allowing wide-angle image to be shot without substantially any blind spots.

Figure 8A:
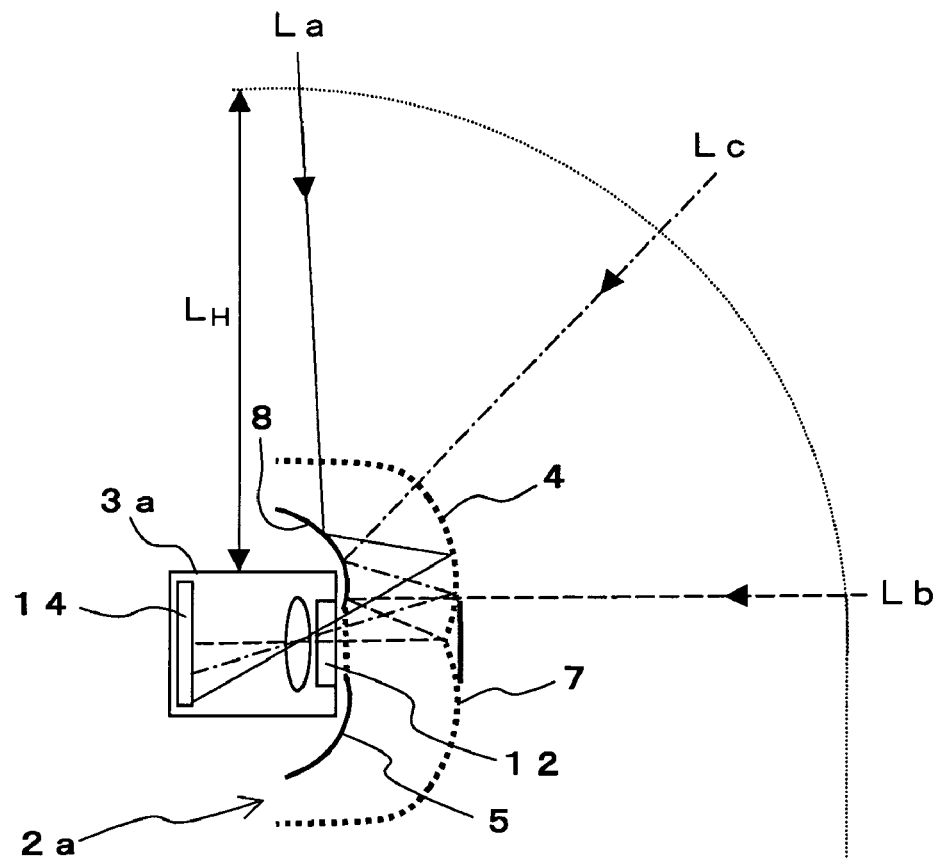
FIG. 8A is a diagram for illustrating a principle of aberration correction in horizontal direction.
Figure 8B:
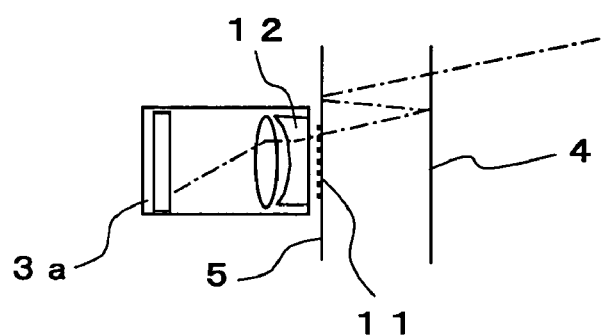
FIG. 8B is a diagram for illustrating a principle of aberration correction in vertical direction.

FIG. 8 illustrates a principle of aberration correction used therein. FIG. 8A is a diagram for illustrating a principle of aberration correction in horizontal direction. FIG. 8B is a diagram for illustrating a principle of aberration correction in vertical direction. The aberration correction in horizontal direction is made by adjusting a curvature of the reflecting concave surface 7 of the surface structure 4 and that of the reflecting convex surface 8 of the surface structure 5 so that a camera-to-subject distance $L_H$ is kept constant in any incident light angles. In other words, whole length of horizontal optical path of each item of incident light from camera to subject is kept constant by adjusting curvatures of the reflecting concave surface 7 and the reflecting convex surface 8, thereby realizing their horizontal aberration correction.

The aberration correction in vertical direction is made by adjusting a curvature of the concave lens 12 in the camera unit 3*a* so that a camera-to-subject distance in the vertical direction can be the same as the camera-to-subject distance $L_H$ in the horizontal direction. In other words, a curvature of the concave lens 12 is adjusted so that whole lengths of vertical optical paths of items of incident light from camera to subject can have the same as each other and the whole length of vertical optical path can be the same as that of the horizontal optical path. This allows their vertical aberration correction to be realized.

Thus, such the aberration correction in horizontal and vertical directions allows highly sensitive wide-angle image to be shot in a high-resolution mode.

As described above, according to the first embodiment of wide-angle shooting apparatus 1*a* according to the invention, in the optical device 2*a* in which the wall-like transmitting and reflecting concave surface structure 4, the first polarizing film 6, and the wall-like reflecting convex surface structure 5 are provided, light is gathered widely in horizontally lateral direction and is made incident into the camera unit 3*a*. This enables image obtained in the two-dimensional image sensor 14 in the camera unit 3*a* to be compressed horizontally. The image, however, has the same field of view as that of the past popular camera unit. This prevents any image conversion processing like that of the past wide-angle camera, from being carried out in the control block shown in FIG. 6.

Further, an optically rectangular image is made incident thereinto, the light-sensitive elements of the two-dimensional image sensor 14 are effectively available, thereby obtaining an image with high precision and sensitivity. In this embodiment, the optical device 2*a* can be constituted by a mirror and polarizing films. This allows the device to be manufactured and downsized at a low price. Specifically, it can be downsized to an item having a size of about 1-cm angle.

[Configuration of Other Embodiments of Wide-angle Shooting Apparatus]

Figure 9A:
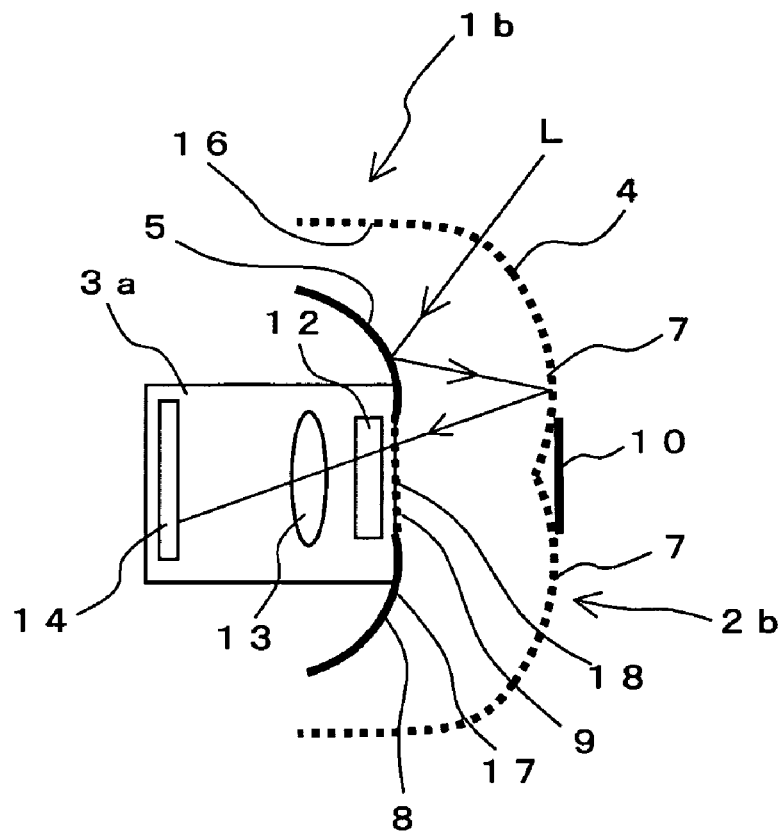
FIG. 9A is a plan view of a second embodiment of a wide-angle shooting apparatus according to the invention for showing a configuration thereof.
Figure 9B:
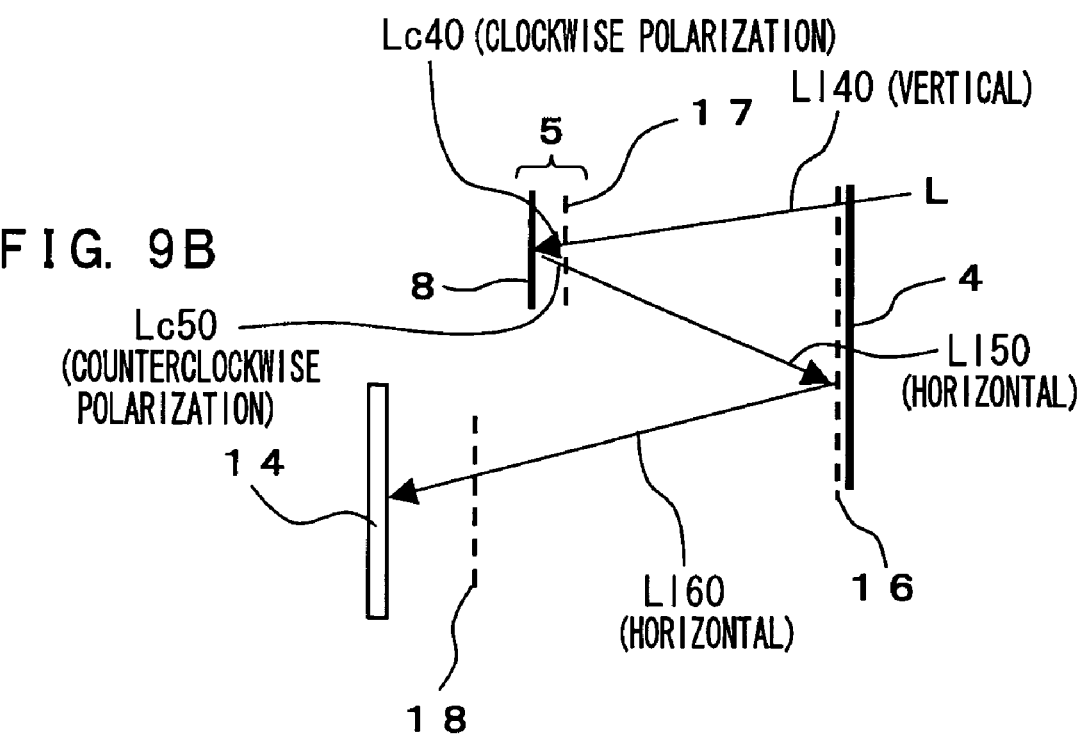
FIG. 9B is a diagram for illustrating conversion processing in polarization states.

FIGS. 9A and 9B are a second embodiment of a wide-angle shooting apparatus 1*b* according to the invention for showing a configuration thereof. FIG. 9A is a plan view of the wide-angle shooting apparatus 1*b* and FIG. 9B illustrates its conversion processing in polarization states.

The wide-angle shooting apparatus 1*b* has an optical device 2*b* that is provide with a linearly polarizing film 16 of reflection type as polarizing film at its wall-like transmitting and reflecting concave surface structure 4. The apparatus 1*b* also has a λ/4 delay film 17 on its wall-like reflecting convex surface structure 5. Further, the apparatus 1*b* has a linearly polarizing film 18 at its camera unit 3*a* (light incident portion 9).

Note that a plane of polarization of the linearly polarizing film 16 of reflection type is perpendicular to a plane of polarization of the linearly polarizing film 18. Other configurations of the apparatus 1b are the same as those of the first embodiment of the wide-angle shooting apparatus 1a according to the invention. Thus, the detailed description of the configurations thereof will be omitted.

The following will describe operations of the second embodiment of the wide-angle shooting apparatus 1b according to the invention. Note that the λ/4 delay film 17 converts light that is made incident to the surface structure 4 from outside and transmitted thereto into circularly polarized light that rotates clockwise, viewed from a front of the apparatus 1b.

An electric field component in a direction of the light L that is made incident to the surface structure 4 from outside, as shown in FIG. 9A, is transmitted through the linearly polarizing film 16 of reflection type, as shown in FIG. 9B. It is noted that in this operation example, linearly polarized light of the above direction is referred to as "vertical" and that of the other direction orthogonal to the above direction is referred to as "horizontal".

Linearly polarized light L140 (vertical) that is made incident to the surface structure 4 and transmitted through the linear polarizing film 16 is made into the wall-like reflecting convex surface structure 5. In the surface structure 5, the λ/4 delay film 17 converts it into the circularly polarized light Lc40 that rotates clockwise. It is then reflected by the reflecting convex surface 8 of the surface structure 5, as shown in FIG. 9A, thereby causing its propagation direction to be reversed.

Thus, the circularly polarized light Lc50 thus reflected has a counterclockwise rotation direction. The circularly polarized light Lc50 thus reflected is then made incident to the λ/4 delay film 17. This λ/4 delay film 17 converts the circularly polarized light Lc50 into the linear polarized light L150 (horizontal). The linearly polarized light L150 is derived from the surface structure 5 to the reflecting concave surface 7 of the surface structure 4.

The converted linearly polarized light L150 is then reflected by the linearly polarizing film 16 of reflection type because a plane of polarization of the linear polarized light L150 is perpendicular to that of the linearly polarizing film 16 of reflection type in the surface structure 4. The linearly polarized light L160 thus reflected (horizontal) is then made incident into the light incident portion 9.

A plane of polarization of the linearly polarizing film 18 positioned at the light incident portion 9 is perpendicular to that of the linearly polarizing film 16 of reflection type in the surface structure 4. This allows the linearly polarized light L160 (horizontal), which has been reflected by the linearly polarizing film 16 and made incident into the light incident portion 9, to be transmitted through the linearly polarizing film 18. The linearly polarized light L160 transmitted trough the polarizing film 18 is corrected in its aberration by the wall-like concave lens 12 to focus the image on the two-dimensional image sensor 14 through the convex lens 13.

Thus, as described above, linearly polarized light such as the linearly polarized light L140, which has been made incident from outside and transmitted through the wall-like transmitting and reflecting concave surface structure 4, has the vertical polarization direction. Since the plane of polarization of the linearly polarizing film 18 is perpendicular to that of the linear polarizing film 16, the direct light beam transmitted from the surface structure 4 is shielded by the linearly polarizing film 18 at the light incident portion 9.

Thus, this allows the light reflected by the wall-like reflecting convex surface structure 5 to be made incident to the camera unit 3a, excluding the direct light beam, from outside, transmitted through the surface structure 4.

Figure 10A:
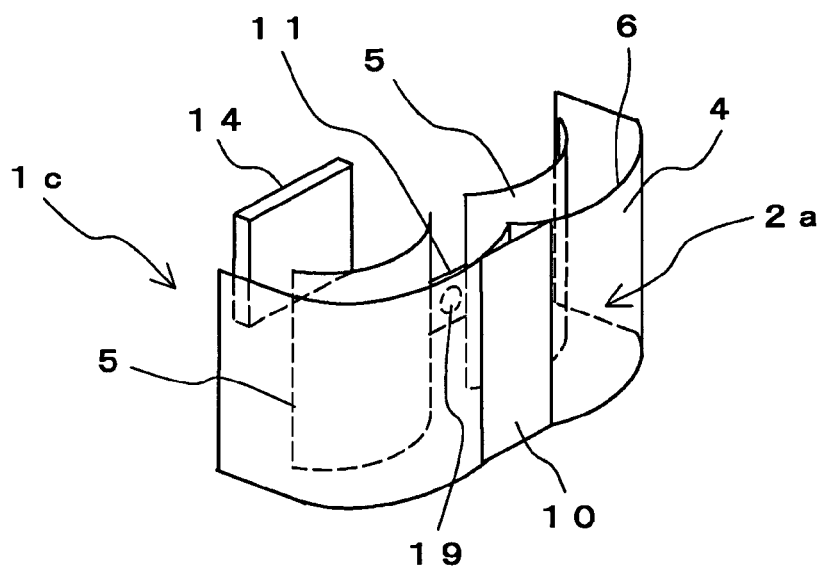
FIG. 10A is a perspective view of a third embodiment of a wide-angle shooting apparatus according to the invention for showing a configuration thereof.
Figure 10B:
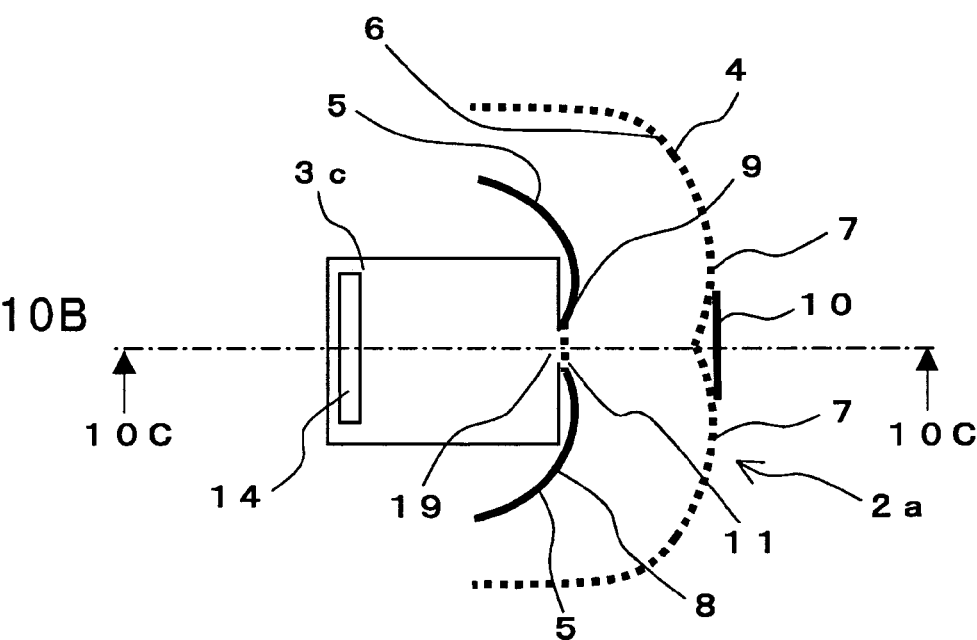
FIG. 10B is a plan view thereof.
Figure 10C:
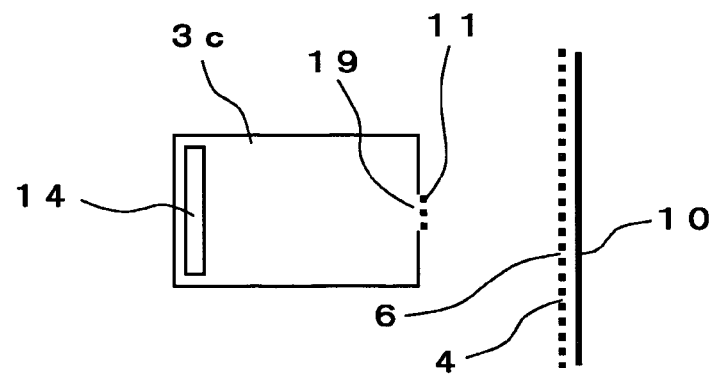
FIG. 10C is a sectional view thereof taken along the line 10C-10C shown in FIG. 10B.

FIGS. 10A through 10C show a configuration of a third embodiment of a wide-angle shooting apparatus according to the invention. FIG. 10A is a perspective view of this wide-angle shooting apparatus 1c. FIG. 10B is a plan view thereof. FIG. 10C is a sectional view thereof taken along the line 10C-10C shown in FIG. 10B.

In the third embodiment of the wide-angle shooting apparatus 1c, the camera unit 3c is provided with a pinhole 19. Such the camera unit 3c having the pinhole 19 has a large focal depth, thereby omitting any concave lens for aberration correction and any convex lens.

Note that the optical device 2a of the third embodiment of the wide-angle shooting apparatus 1c may be so configured that it can be the same as that of the first embodiment of the wide-angle shooting apparatus 1a. In this case, a second polarizing film 11 is positioned at the pinhole 19.

The operations of this optical device 2a of the third embodiment of the wide-angle shooting apparatus 1c is the same as those described relative to FIGS. 4A and 4B. Light transmitted through the wall-like transmitting and reflecting concave surface structure 4 is reflected by the reflecting convex surface 8 of the wall-like reflecting convex surface structure 5. The light thus reflected is then reflected by the reflecting concave surface 7 of the surface structure 4. The light thus reflected by the reflecting concave surface 7 is transmitted through the second polarizing film 11. The light thus transmitted is focused on the two-dimensional image sensor 14 by bringing to a focus on it by the pinhole 19.

Further, note that the third embodiment of the wide-angle shooting apparatus 1c may be so configured so to have the optical device 2b of the second embodiment of the wide-angle shooting apparatus 1b.

[Specific Examples in Embodiments of Wide-angle Shooting Apparatus]

Figure 11A:
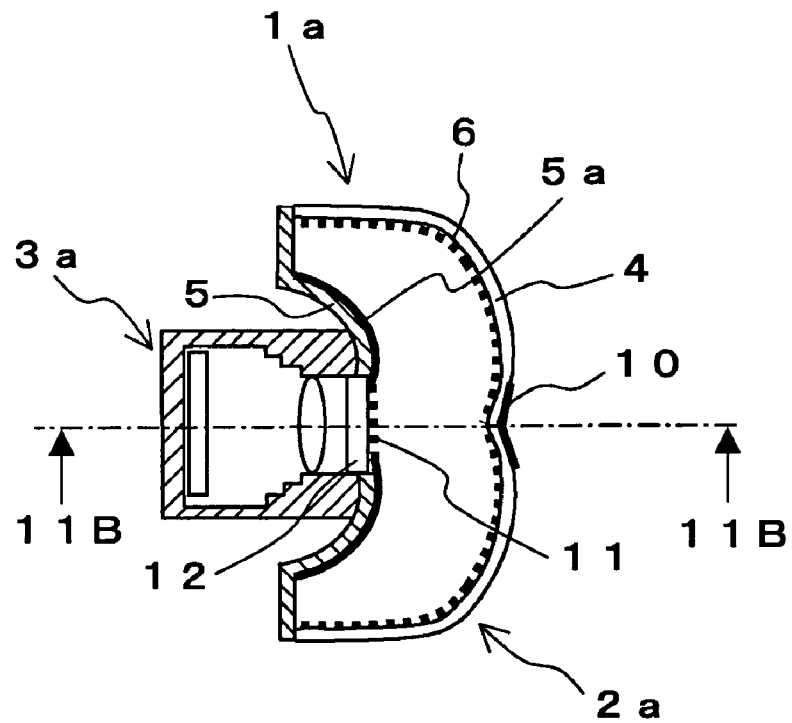
FIG. 11A is a sectional plan view of a specific example of the first embodiment of a wide-angle shooting apparatus according to the invention for showing a configuration thereof.
Figure 11B:
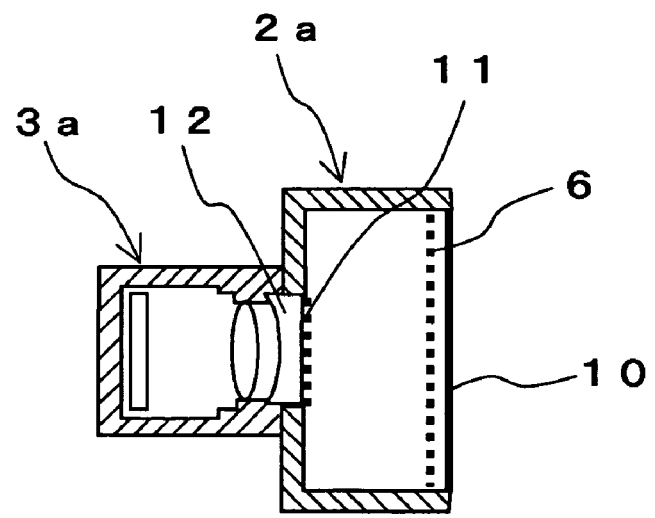
FIG. 11B is a sectional view thereof taken along the line 11B-11B shown in FIG. 11A.

FIGS. 11A, 11B, 12A, and 12B show configurations of specific examples in the embodiments of the wide-angle shooting apparatuses. FIG. 11A is a sectional plan view of a specific example of the first embodiment of the wide-angle shooting apparatus 1a according to the invention. FIG. 11B is a sectional view thereof taken along the line 11B-11B shown in FIG. 11A.

Figure 12A:
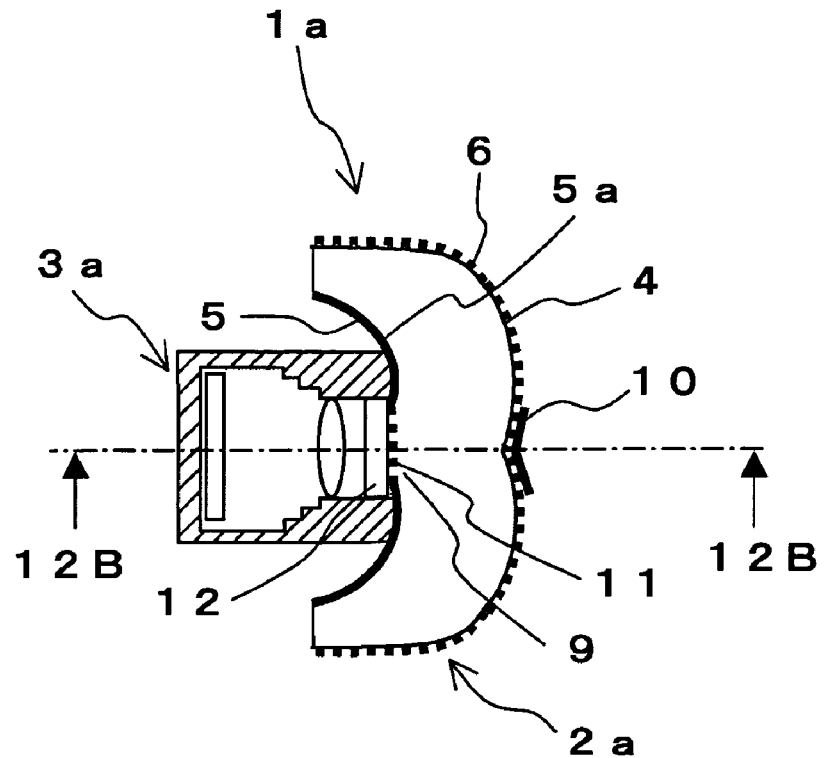
FIG. 12A is a sectional plan view of another example of the first embodiment of a wide-angle shooting apparatus according to the invention for showing a configuration thereof.
Figure 12B:
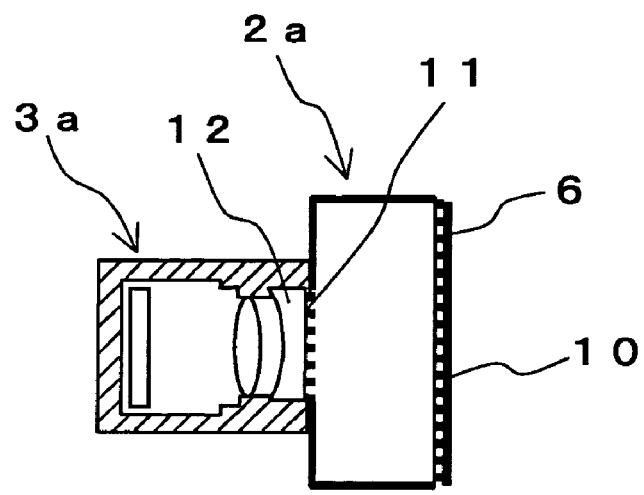
FIG. 12B is a sectional view thereof taken along the line 12B-12B shown in FIG. 12A.

FIG. 12A is a sectional plan view of another specific example of the first embodiment of the wide-angle shooting apparatus 1a according to the invention. FIG. 12B is a sectional view thereof taken along the line 12B-12B shown in FIG. 12A.

According to the configuration of the wide-angle shooting apparatus 1a shown in FIGS. 11A and 11B, the wall-like transmitting and reflecting concave surface structure 4 is made of transparent glass or plastic material. The first polarizing film 6 is adhered over a whole rear surface of the surface structure 4. The light-shielding plate 10 is adhered to the front surface of the surface structure 4.

The wall-like reflecting convex surface structure 5 is made of plastic material and the like. The mirror 5a is formed on the surface structure 5 by evaporation or the like. The surface structures 4 and 5 are then adhered to each other on the whole by an adhesive to configure the optical device 2a.

Note that the top and bottom surfaces of the optical device 2a are shielded. Further, the second polarizing film 11 is adhered to a front of the wall-like concave lens 12 of the camera unit 3a, for example.

According to the configuration of the wide-angle shooting apparatus 1a shown in FIGS. 12A and 12B, the optical device 2a is formed of optical block made of transparent glass, plastic material or the like. The surface structure 4 is formed on a front surface side of the optical block. The surface structure 5 is formed on a rear surface side thereof.

The first polarizing film 6 is adhered to the front surface of the surface structure 4. The light-shielding plate 10 is also adhered to the front surface of the surface structure 4. The mirror 5a is formed on the surface structure 5 excluding the light incident portion 9.

Note that the top and bottom surfaces of the optical device 2a are shielded. Further, the second polarizing film 11 is adhered to a periphery of the light incident portion 9 in the optical device 2a, for example.

Although the specific examples of the first embodiment of the wide-angle shooting apparatus 1a have been described in accordance with FIGS. 11A, 11B, 12A, and 12B, this invention is not limited to it. The specific examples of the second and third embodiments of the wide-angle shooting apparatuses 1b and 1c are enable to be realized with them having the same configuration of the specific examples of the first embodiment of the wide-angle shooting apparatus 1a.

For example, in the wide-angle shooting apparatus 1b, the mirror 5a can be formed on the surface structure 5 and the λ/4 delay film 17 can be adhered to it.

Figure 13:
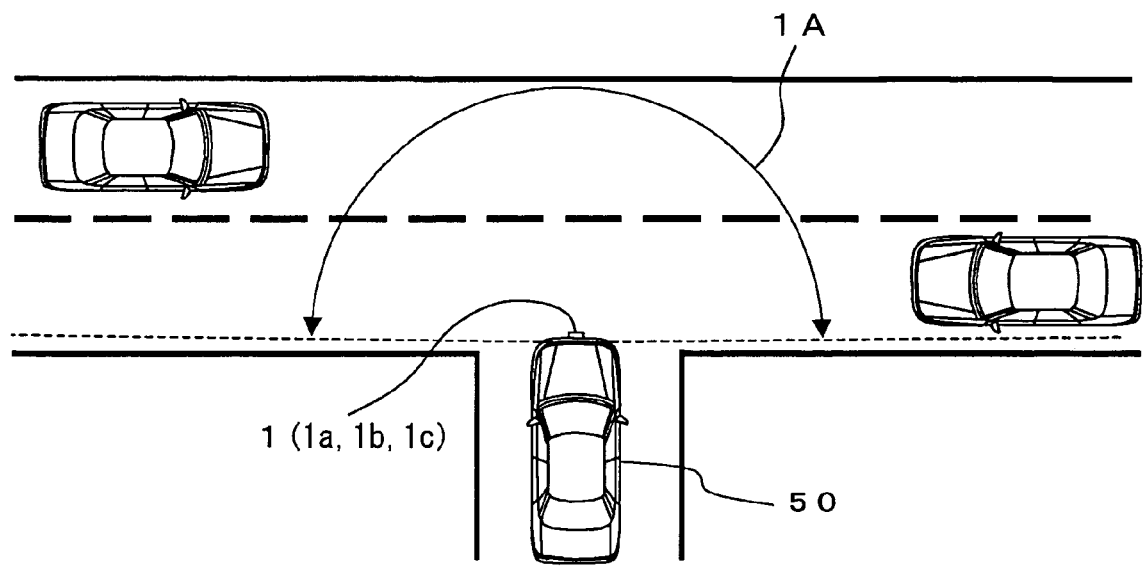
FIG. 13 is a diagram for illustrating an application example to which an embodiment of a wide-angle shooting apparatus according to the invention is applied.
Figure 14:
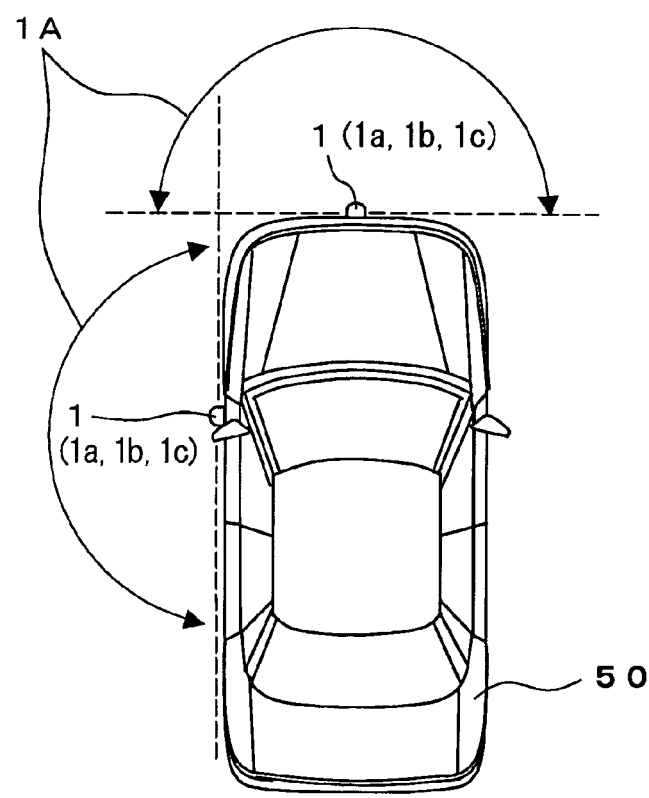
FIG. 14 is a diagram for illustrating another application example to which an embodiment of wide-angle shooting apparatuses according to the invention is applied.

FIGS. 13 and 14 illustrate application examples to which each of the embodiments of a wide-angle shooting apparatus according to the invention is applied.

In the application example shown in FIG. 13, the wide-angle shooting apparatus 1 (1a, 1b, and 1c) is attached to a front body, for example, a bumper of a vehicle 50.

The wide-angle shooting apparatus 1 may have field angle 1A of almost 180 degrees in a horizontal direction. Even if a vehicle is driven toward a narrow intersection, the wide-angle shooting apparatus 1 may have a wide field of view without entering the vehicle 50 into the intersection, thereby allowing the wide-angle shooting apparatus 1 to be applied to a so-called blind corner camera whereby safety check may be performed in right and left directions.

In the application example shown in FIG. 14, the wide-angle shooting apparatuses 1, 1 (1a, 1b, and 1c) are attached to a portion around a rear view mirror attached to a door opposite to a driver's sheet in addition to the front body, for example, the bumper of the vehicle 50.

Each of the wide-angle shooting apparatuses 1, 1 may have field angle 1A of almost 180 degrees in their horizontal direction, so that it is possible to watch almost whole regions of the front and side of the vehicle 50 indirectly.

Thus, since each of the wide-angle shooting apparatuses 1, 1 may have field angle 1A of almost 180 degrees in a horizontal direction, such the wide-angle shooting apparatuses can relatively shoot images each having little blind spot without any deformations in each of the images relative to a portion just prior to and a side of the vehicle 50.

The above embodiments of the wide-angle shooting apparatus according to the invention can be used for a camera built in a vehicle, a door phone or the like for checking a safety condition.

Thus, have been described the embodiments of the wide-angle shooting apparatus and the optical device according to the present invention. The invention enable the optical device having a simple configuration to be realized, thereby downsizing it and lowering in its product cost. It should be understood by those skilled in the art that various modifications, combinations, sub-combinations and alternations may occur depending on design requirements and other factors insofar as they are within the scope of the appended claims or the equivalents thereof.

What is claimed is:

1. A wide-angle shooting apparatus comprising:
   a convex surface structure which reflects light from outside;
   a concave surface structure having a first polarizing means for permitting the light from outside to be transmitted and reflecting the light reflected by the convex surface structure, said concave surface structure being positioned before the convex surface structure;
   a second polarizing means for permitting the light reflected by the concave surface structure to be transmitted and shielding direct light beam transmitted through the concave surface structure, said second polarizing means being positioned at a light incident portion to which the light reflected by the concave surface structure is concentrated; and
   image-shooting means for receiving the light transmitted through the second polarizing means and shooting an image.

2. The wide-angle shooting apparatus according to claim 1, further comprising light-shielding means for shielding light from the front, said light-shielding means being provided at a surface of the concave surface structure away from the image-shooting means;
   wherein the convex surface structure and the concave surface structure reflect the light incident from the front except for the light-shielding means toward the second polarizing means to provide an image around a center of the image-shooting means.

3. The wide-angle shooting apparatus according to claim 1, wherein the first polarizing means includes a polarizer which permits linearly polarized light of a first direction to be transmitted and reflects linearly polarized light of a second direction orthogonal to the first direction and a wavelength retardation plate for converting the linearly polarized light into circularly polarized light; and
   wherein the second polarizing means includes a wavelength retardation plate for converting the circularly polarized light into linearly polarized light and a polarizer which permits the linearly polarized light of the second direction to be transmitted and reflects the linearly polarized light of the first direction.

4. The wide-angle shooting apparatus according to claim 1, wherein the first polarizing means includes a polarizer which permits linearly polarized light of a first direction to be transmitted and reflects linearly polarized light of a second direction orthogonal to the first direction;
   wherein the second polarizing means includes a polarizer which permits the linearly polarized light of the second direction to be transmitted and reflects the linearly polarized light of the first direction; and
   wherein a wavelength retardation plate for converting linearly polarized light exited from the concave surface structure into circularly polarized light, making the circularly polarized light thus converted incident to the convex surface structure, converting the circularly polarized light reflected by the convex surface structure into linearly polarized light, and making the linearly polarized light thus converted incident to the concave surface structure, said wavelength retardation plate being provided between the convex surface structure and the concave surface structure.

5. A wide-angle shooting apparatus comprising:
a convex surface structure which reflects light from outside;
a concave surface structure having a first polarizing device which permits the light from outside to be transmitted and reflects the light reflected by the convex surface structure, said concave surface structure being positioned before the convex surface structure;
a second polarizing device which permits the light reflected by the concave surface structure to be transmitted and shields direct light beam transmitted through the concave surface structure, said second polarizing device being positioned at a light incident portion to which the light reflected by the concave surface structure is concentrated; and
image-shooting device which receives the light transmitted through the second polarizing device and shoots an image.

6. Optical device comprising:
a convex surface structure which reflects light from outside;
a concave surface structure having a first polarizing means for permitting the light from outside to be transmitted and reflecting the light reflected by the convex surface structure, said concave surface structure being positioned before the convex surface structure; and
a second polarizing means for permitting the light reflected by the concave surface structure to be transmitted and shielding direct light beam transmitted through the concave surface structure, said second polarizing means being positioned at a part to which the light reflected by the concave surface structure is concentrated.

7. The optical device according to claim 6, wherein the first polarizing means includes a polarizer which permits linearly polarized light of a first direction to be transmitted and reflects linearly polarized light of a second direction orthogonal to the first direction and a wavelength retardation plate for converting the linearly polarized light into circularly polarized light; and
wherein the second polarizing means includes a wavelength retardation plate for converting the circularly polarized light into linearly polarized light and a polarizer which permits the linearly polarized light of the second direction to be transmitted and reflects the linearly polarized light of the first direction.

8. The optical device according to claim 6, wherein the first polarizing means includes a polarizer which permits linearly polarized light of a first direction to be transmitted and reflects linearly polarized light of a second direction orthogonal to the first direction;
wherein the second polarizing means includes a polarizer which permits the linearly polarized light of the second direction to be transmitted and reflects the linearly polarized light of the first direction; and
wherein a wavelength retardation plate for converting linearly polarized light exited from the concave surface structure into circularly polarized light, making the circularly polarized light thus converted incident to the convex surface structure, converting the circularly polarized light reflected by the convex surface structure into linearly polarized light, and making the linearly polarized light thus converted incident to the concave surface structure, said wavelength retardation plate being provided between the convex surface structure and the concave surface structure.

9. Optical device comprising:
a convex surface structure which reflects light from outside;
a concave surface structure having a first polarizing device which permits the light from outside to be transmitted and reflects the light reflected by the convex surface structure, said concave surface structure being positioned before the convex surface structure; and
a second polarizing device which permits the light reflected by the concave surface structure to be transmitted and shields direct light beam transmitted through the concave surface structure, said second polarizing device being positioned at a part to which the light reflected by the concave surface structure is concentrated.

* * * * *